United States Patent [19]
Hui

[11] Patent Number: 5,260,782
[45] Date of Patent: Nov. 9, 1993

[54] ADAPTIVE DCT/DPCM VIDEO SIGNAL CODING METHOD

[75] Inventor: Lucas Y. Hui, Singapore, Singapore

[73] Assignee: Matsushita Electric Industrial Co., Ltd., Osaka, Japan

[21] Appl. No.: 937,104

[22] Filed: Aug. 31, 1992

[30] Foreign Application Priority Data

Aug. 30, 1991 [JP] Japan .................................. 3-219554

[51] Int. Cl.$^5$ ...................... H04N 7/133; H04N 7/137
[52] U.S. Cl. .................................. 358/133; 358/105; 358/136
[58] Field of Search ....................... 358/133, 105, 136

[56] References Cited

U.S. PATENT DOCUMENTS

| | | | |
|---|---|---|---|
| 4,827,340 | 5/1989 | Pirsch | 358/133 |
| 5,008,745 | 4/1991 | Willoughby | 358/133 |
| 5,073,820 | 12/1991 | Nakagawa et al. | 358/133 |

FOREIGN PATENT DOCUMENTS

| | | |
|---|---|---|
| 434429A2 | 6/1991 | European Pat. Off. . |
| 1-173974 | 7/1989 | Japan . |
| 2-84894 | 8/1990 | Japan . |

OTHER PUBLICATIONS

"Hybrid Image Coding Scheme Incorporating Human Visual System Characteristics", Ngan et al., 2417 Optical Engineering, Jul. 1991, No. 7, Bellingham, WA pp. 940-946.

"Interpolative, Predictive and Pyramid Transform Coding of Color Images", Haskell, AT & T Bell Laboratories, Holmdel, NJ. 1988 IEEE pp. 785-787.

"HDTV Transmission System in an ATM-based Network", Kishimoto et al., 8376 Signal Processing Image Communication, Jun. 1991, Amsterdam, NE, '91 Elsevier Science Publishers, pp. 111-122.

IEEE Transactions On Communications, vol. 36, No. 3, Mar. 1988; "A Subjective Evaluation of Noise-Shaping Quantization for Adaptive Intra-/Interframe DPCM Coding of Color Television Signals", Bernd GIROD et al.

International Organization For Standardization, ISO-/IEC/SC2/WG11, "Coding Of Moving Pictures And Associated Audio"; MPEG90/041; Jul. 1990; Source: Simulation Model Editorial Group, MPEG Video Simulation Model Three (SM3).

Primary Examiner—Tommy Chin
Assistant Examiner—Vu Le
Attorney, Agent, or Firm—Wenderoth, Lind & Ponack

[57] ABSTRACT

An input frame of video sequence is partitioned into smaller blocks of pixel data where each block is subjected to an edge detection which examines the activities in the block itself and the surrounding blocks to determine whether the block can be classified as an edge block. If the block is classified as a non-edge block, the conventional DCT coding method (e.g. SM3) with or without motion compensation is applied to the block. On the other hand, if the block is classified as an edge block, the block is subjected to a pixel value prediction process with or without reference to the previously coded frames, followed by a quantization process, and a run-length encoding process with variable length codes, i.e., a DPCM process.

3 Claims, 2 Drawing Sheets

ADAPTIVE DCT/DPCM VIDEO SIGNAL CODING METHOD

BACKGROUND OF THE INVENTION

1. Field of the Invention

This invention relates to a method of coding a video signal for digital storage media and transmission media.

2. Description of the Prior Art

Discrete Cosine Transform (DCT) has been widely used for bandwidth compression of digital color video signals. It is the adopted basic method by the ISO/WG11 MPEG (Motion Picture Experts Group) for recommendation to the International Standardization Organization (ISO) for coded representation of moving picture information at around 1.15 Mbits/s data rate. In this proposed standard by MPEG, combination of motion compensation techniques and DCT coding method is used. The DCT coding method involves the discrete cosine transformation of the motion or non-motion compensated input block, the quantization of the DCT coefficients based on quantization matrices and a rate-controller, zig-zag scanning of the quantized DCT coefficients, and variable length coding the run and level of the quantized DCT coefficients. The method proposed by MPEG is described in detail in the document "MPEG Video Simulation Model Three (SM3)," ISO-IEC/JTC1/SC2/WG8, MPEG 90/041, 1990.

The basic coding method of SM3 can be applied to various input video format, and adapted to code video signal at different data rates.

Basically, DCT converts statistically dependent picture elements (pixels) into independent coefficients. The results are usually energy concentrated into only a few of the coefficients containing the main part of the picture information which are quantized and run-length encoded. However, it is not easy to apply this concept when the transform pixel block is small in size and contains an edge boundary of an object. Transformation of such edge block will not lead to efficient compaction of signal energy. To illustrate this problem, two blocks of 8×8 pixels, one containing an edge, were extracted from an image sequence and two dimensionally discrete cosine transformed. The results are shown in Tables 1A, 1B, 2A and 2B.

TABLE 1A

| Non-Edge Block Sample | | | | | | | |
|---|---|---|---|---|---|---|---|
| 104 | 106 | 109 | 107 | 104 | 101 | 99 | 98 |
| 105 | 107 | 104 | 102 | 97 | 100 | 99 | 94 |
| 102 | 102 | 99 | 97 | 98 | 96 | 94 | 95 |
| 98 | 98 | 97 | 98 | 92 | 89 | 93 | 91 |
| 96 | 93 | 96 | 93 | 88 | 89 | 88 | 85 |
| 90 | 91 | 90 | 84 | 88 | 85 | 84 | 81 |
| 86 | 87 | 88 | 84 | 81 | 85 | 83 | 79 |
| 83 | 79 | 82 | 79 | 82 | 83 | 82 | 82 |

TABLE 1B

| Transformed Non-Edge Block Sample | | | | | | | | |
|---|---|---|---|---|---|---|---|---|
| 740 | 20 | −1 | −1 | −4 | 2 | 1 | 1 | |
| 60 | 6 | −2 | −3 | 1 | 0 | −2 | −2 | |
| 0 | −5 | −2 | 1 | −1 | −1 | 2 | 0 | |
| 3 | 4 | −4 | −1 | −2 | 0 | 1 | 1 | |
| 1 | −3 | −2 | −3 | 3 | 3 | 1 | 1 | /16 |
| 1 | 0 | −2 | −3 | 1 | 0 | −1 | 0 | |
| −1 | −2 | 0 | 1 | 3 | −4 | 0 | 3 | |
| 1 | 0 | −1 | 0 | 0 | 0 | 3 | −1 | |

TABLE 2A

| Edge Block Example | | | | | | | |
|---|---|---|---|---|---|---|---|
| 244 | 232 | 241 | 233 | 222 | 207 | 211 | 207 |
| 233 | 190 | 176 | 210 | 217 | 228 | 210 | 211 |
| 74 | 70 | 76 | 118 | 220 | 234 | 216 | 210 |
| 170 | 194 | 181 | 100 | 52 | 188 | 237 | 210 |
| 243 | 230 | 241 | 88 | 70 | 227 | 223 | 208 |
| 236 | 232 | 222 | 249 | 90 | 73 | 236 | 217 |
| 242 | 222 | 254 | 156 | 41 | 200 | 232 | 204 |
| 247 | 229 | 243 | 212 | 44 | 129 | 245 | 206 |

TABLE 2B

| Transformed Edge Block Sample | | | | | | | | |
|---|---|---|---|---|---|---|---|---|
| 1527 | 0 | 189 | −56 | −106 | 104 | 23 | −28 | |
| 20 | −108 | −134 | 117 | 76 | −100 | −1 | 28 | |
| 111 | 78 | −53 | −24 | 58 | 32 | −19 | −7 | |
| 109 | 133 | 24 | −53 | 7 | 18 | −7 | 5 | |
| 27 | 63 | 63 | −22 | −70 | 4 | 26 | 0 | /16 |
| −38 | −30 | 4 | −11 | −36 | −1 | 10 | −4 | |
| −41 | −46 | −58 | −33 | 72 | 6 | −67 | 17 | |
| −19 | −60 | −22 | 69 | −35 | −46 | 61 | 17 | |

From Tables 1A, 1B, 2A and 2B, it can be seen that with the non-edge block, the energy of the block after transformation is concentrated at the DC coefficient (top-left corner) and the two AC coefficients near it. On the other hand, the transformed edge block AC energy is randomly distributed. Coding of such transformed block is very difficult, and leads to ringing effects (or corona effects) around the edges usual to transform coding method.

Conventional DCT coding method is efficient in coding block with spatially correlated pixel values. However, if the block contains an edge boundary of an object against a smooth background, the spatial correlation of the pixel values in the block will be low and the two dimensional discrete cosine transformation of the block will not lead to efficient compaction of the block signal energy. The quantization process of the DCT coefficient of such block usually creates large distortion or quantization noise that cannot be masked.

SUMMARY OF THE INVENTION

An object of the present invention is to provide a method of coding a video signal without causing the ringing effects around an edge boundary of an object against a smooth background.

Another object of the present invention is to provide a method of decoding the thus coded video signal.

It was found that the Differential Pulse Code Modulation (DPCM) method, compared to the DCT method, has a better efficiency in terms of de-correlating the pixel values in the edge block. In order to take advantage of the DPCM method on the edge blocks, an adaptive coder can be designed with two coding methods, a DPCM coder optimized for the edge blocks and a DCT coder optimized for the non-edge blocks, and an optimized selection process to classify the input pixel blocks and select the correct coder.

Based on this concept, in a video signal coding method according to the present invention, each frame of an input video signal is partitioned into smaller blocks of pixel data, and each block is subjected to an edge detection which examines the block and its surrounding blocks to determine whether the block can be classified as an edge block. If the block is not classified as an edge block, the block is subjected to a discrete cosine transform coding process, where the block is discrete cosine transformed into DCT coefficients, quantized, zig-zag scanned, and run-length encoded with variable length codes. On the other hand, if the block is classified as an edge block, the edge block is subjected to a differential pulse code modulation process, where each of the pixel value in the block is predicted, the differences between the pixel values and the predicted values are quantized and run-length encoded with variable length codes.

According to the present invention using the DPCM method, which has better efficiency in de-correlating the pixel values in the edge blocks, for the edge blocks, the ringing (corona) effects around the edges occurring during conventional coding techniques can be reduced. Subjective quality of the reconstructed video sequences using the present invention has shown improvement over the SM3 method.

Preferably, before subjecting the block to the discrete cosine transform coding process or the differential pulse code modulation process, the block may be subjected to a motion compensation process to reduce the temporal redundancy.

In a method of decoding the thus coded video signal according to the present invention, variable length encoded run-length codes are decoded to reconstruct quantized coefficients of each block of coded frames. Each decoded quantized coefficient block, if it has been coded by a discrete cosine transform coding process, is subjected to an inverse quantization process, and an inverse discrete cosine transformation process, and an inverse motion compensation process if it is coded using a motion compensation process to reconstruct block pixel values to be placed into a frame buffer. On the other hand, if the decoded quantized coefficient block has been coded by a differential pulse code modulation process, each coefficient in the quantized coefficient block is subjected to an inverse quantization and addition with predicted pixel values to reconstruct block pixel values to be placed into the frame buffer.

DESCRIPTION OF THE PREFERRED EMBODIMENTS

In the present invention, an input frame of video sequence is partitioned into smaller blocks of pixel data where each block is subjected to an edge detection which examines the activities in the block itself and the surrounding blocks to determine whether the block can be classified as an edge block. If the block is classified as a non-edge block, the conventional DCT coding method (eg. SM3) with or without motion compensation is applied to the block. On the other hand, if the block is classified as an edge block, the block is subjected to a pixel value prediction process with or without reference to the previously coded frames, followed by a quantization process, and a run-length encoding process with variable length codes, i.e., a DPCM process.

Figure 1:
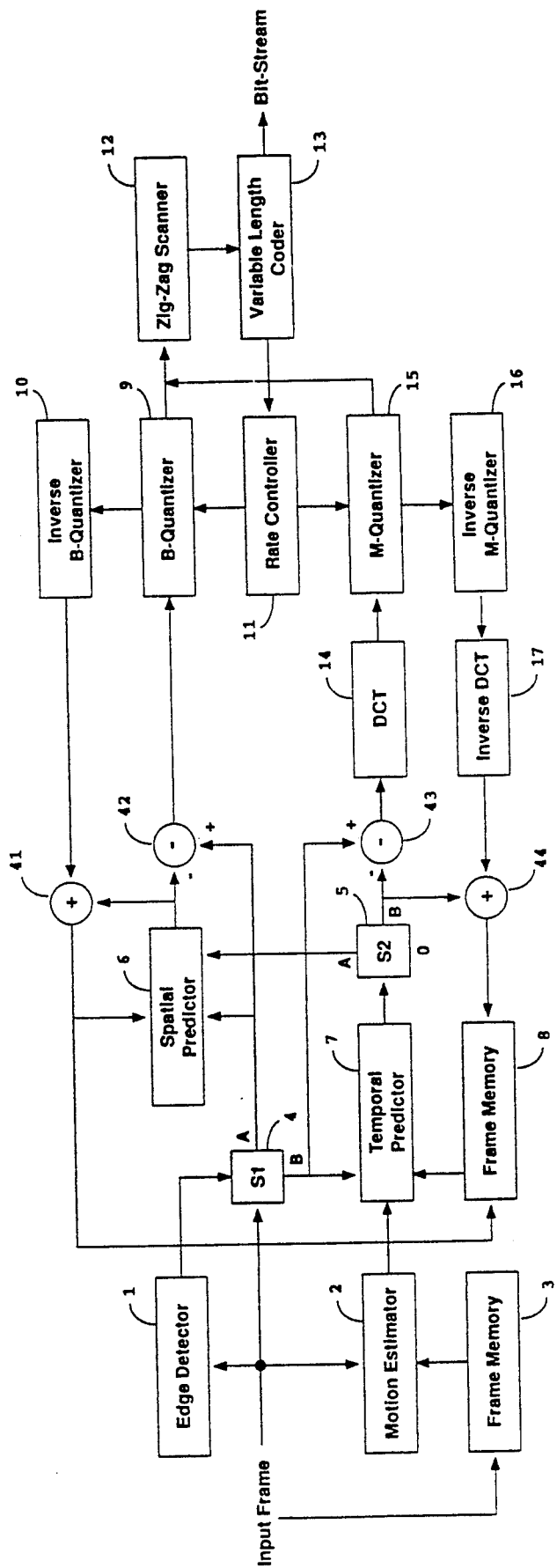
FIG. 1 is a block diagram of an adaptive DCT/DPCM encoder in an embodiment of the present invention.

As a preferred embodiment of the present invention, an adaptive DCT/DPCM encoder is shown in FIG. 1. An input frame to the video signal encoder is first digitized and partitioned into spatially non-overlapping blocks of pixel data. To provide a reasonable level of adaptiveness, a block size of $8 \times 8$ pixels may be used. Each partitioned block is then subjected to an edge detection process in an edge detector 1 and a motion estimation process in a motion estimator 2.

In the edge detector 1, the amount of activity in each input block is calculated and compared with a predefined threshold value $t1$. The sum of the square deviation of the block pixel intensity values from the mean block intensity value can be used as representation of the block activity. If the calculated activity is greater than $t1$, then the activities of the surrounding blocks are compared with another threshold value $t2$. If any one of the activities of the surrounding blocks is lower than $t2$, the input block is considered as a boundary block between an object in the video sequence and a smooth background or region. In such a case, the input block is classified as an edge block. The determination of the threshold values $t1$ and $t2$ is experimental, and 5300 and 1000 respectively were found to be one of the reasonable sets.

The motion estimator 2 is to estimate a motion vector for the input block with reference to a temporally close reference frame stored in a frame memory 3. The reference frame can be an original unprocessed frame as shown in FIG. 1, or a previous coded frame. Bi-directional motion estimation such as the one described in SM3algorithm can also be applied in the present invention.

The detection result of the edge detector 1 controls a first switch (S1) 4 and a second switch (S2) 5 to determine outputs of these switches. In the case of an edge block, each of the switches 4 and 5 is switched to its position A. Hence, the input block is subjected to a DPCM process. On the other hand, when the input block is a non-edge block, each of the switches 4 and 5 is switched to its position B. In this case, the input block is basically subjected to a DCT process. The second switch 5 can also be set to a position 0 (no output) in the later case if the block is to be coded using DCT method without motion reference to any frame. The detection result of the edge detector 1 will be encoded as part of the coded video information at the output bit stream to signal a decoding apparatus whether or not each decoding block is an edge block.

In the DPCM process, the pixel values in the input block is scanned and subjected to a prediction process pixel by pixel. The prediction process is performed by a spatial predictor 6 and a temporal predictor 7, which basically predict the value of current input pixel based on the coded values of past neighboring pixels stored in a frame memory 8 or locally in the spatial predictor 6. A simple implementation of the spatial predictor is one with output equals to the average of the coded values of the pixel to the left and above the current pixel position. Many adaptive schemes for prediction exist and may be applied to the present invention for better prediction. The temporal predictor 7 provides pixel value prediction. The temporal predictor 7 provides pixel value prediction using temporal or motion reference to past coded frames, and also the task of obtaining past coded pixel values that do not belong to the current input block. The combination of the spatial predictor 6 and the temporal predictor 7 can be operated in two modes: an intra-coded mode and a predictive-coded mode. In the intra-coded mode, where no reference is made to other frames, the temporal predictor 7 supplies the past coded pixel values that do not belong to the current input block (mainly pixel values from the left and the top) to the spatial predictor 6, where values of each pixel in the block can be predicted using the mentioned methods. In the case of the predictive-coded mode, the temporal predictor 7 provides the extra task of obtaining a motion displaced block or motion interpolated blocks selected by method similar to SM3 algorithm from reference frames using the estimated motion vectors to the spatial predictor 6. The spatial predictor 6 in this case will make use of the extra motion displaced block or the motion interpolated block to perform three-dimensional prediction. Hence, the predictor will adaptively make use of the coded pixel values to the left and above the current pixel, and also the coded value of the pixel value in the corresponding pixel position in the motion displaced or interpolated block. An alternative simple prediction method would use just the coded pixel value from the corresponding pixel position in the motion displaced or interpolated block as prediction value.

A prediction error, which is a difference between an original value and a predicted value of the current pixel, is obtained by subtracting at a subtractor 42 the predicted pixel value of the spatial and temporal predictors 6 and 7 from the input pixel value from the first switch 4. The prediction error is quantized by a quantizer 9 controlled by a quantizer step set by a rate-controller 11. An example of the quantizer 9 is the B-quantizer described in a paper by Bernd Girod, et al., "A Subjective Evaluation of Noise-Shaping Quantization for Adaptive Intra/Interframe DPCM Coding of Color Television Signals," IEEE Transaction on Communication. Vol. 36, No. 3, March 1988, pp. 332-346. The characteristic of the B-quantizer is defined by a masking function m(e) which limits a quantization error e. The masking function is given by:

$$m(e) = b(\sqrt{|e|})$$

where e is the prediction error.

An example of the quantization process performed by the B-quantizer 9 is given by:

$$q = (int)\left(\frac{\sqrt{|e|}}{b}\right) \times \text{Sign}(e)$$

where
q is the quantized output, and
Sign(e) = −1 if e < 0,
else Sign(e) = 1.

The corresponding inverse B-quantization process performed by an inverse B-quantizer 10 is given by:

$$e' = (int)(q^2 + |q|) \times b^2) \times \text{Sign}(q)$$

where e' is the inverse quantized value.

To increase coding efficiency of the quatization for a block with motion compensation performed by the B-quantizer 9 can be modified with some dead-zone for such block:

$$q = (int)\left(\frac{\sqrt{4|e| + b^2}}{2b} - 0.5\right) \times \text{Sign}(e).$$

In this case, the corresponding inverse B-quantization process performed by an inverse B-quantizer 10 is given by:

$$e' = (int)\left(\left(q^2 + |q| + \frac{|q| + k}{2b}\right) \times b^2\right) \times \text{Sign}(q)$$

where
k = 0 if q = 0,
else k = 1.

Hence, the amount of output quantization noise and coded information is basically controlled by only one parameter b. The rate-controller 11 monitors the amount of output information (or bits) generated by a variable length coder 13, and sets the value of a quantizer step periodically to the B-quantizer 9 which controls the value of b. An example of the rate-controller 11 is the one used in the SM3 algorithm. In this case, the output quantizer step of the SM3 rate-controller is scaled and offset to obtain the value of b.

The output of the B-quantizer 9 consists of reasonable amount of zero coefficients, and remaining values are small (mostly with value 1). Therefore, the output of the B-quantizer 9 can be run-length encoded with a zig-zag scanner 12 used in SM3 algorithm which produces the run and level of the non-zero coefficients of the B-quantizer output. Each output run and level pair of the zig-zag scanner 12 is further encoded by variable length codes by the variable length coder 13. An example of the variable length coder 13 for the present invention may be the SM3 variable length coder.

If the input block is classified as a non-edge block by the edge detector 1, the input block is subjected to coding by the conventional DCT, coding method such as the SM3 algorithm, which basically consists of temporal prediction of the input block performed by the temporal predictor 7 using the estimated motion vector, motion compensation by subtracting at a subtractor 43 the predicted block from the second switch 5 from the input block from the first switch 4, discrete cosine transformation of the motion compensated block into DCT coefficients performed by a discrete cosine transformer (DCT) 14, quantization of the DCT coefficients using quantizer matrix (M-quantization) performed by an M-quantizer 15, and quantizer step controlled by the rate-controller 11, zig-zag scanning (run-length encoding) of the quantized coefficients performed by the zig-zag scanner 12, and variable length coding of the scanned coefficients performed by the variable length coder 13 to produce the output bit-stream of the coded sequence.

The coefficients subjected to the B-quantization in the B-quantizer 9 are subjected to an inverse B-quantization process in the inverse B-quantizer 10 followed by addition of the corresponding predicted values at an adder 41 to form the reconstructed values to be stored in the frame memory 8 and possibly at the spatial predictor 6 for prediction of following inputs from the same block. The DCT coefficients subjected to the M-quantization in the M-quantizer 15 are subjected to an inverse M-quantization process in an inverse M-quantizer 16 and then to an inverse discrete cosine transform in an inverse discrete cosine transformer 17 followed by addition of the corresponding predicted values from the temporal predictor 7 at an adder 44 to form the reconstructed values to be stored in the frame memory 8. The quantizer and inverse quantizer in SM3 may be used as the M-quantizer 15 and the inverse M-quantizer 16, respectively.

Figure 2:
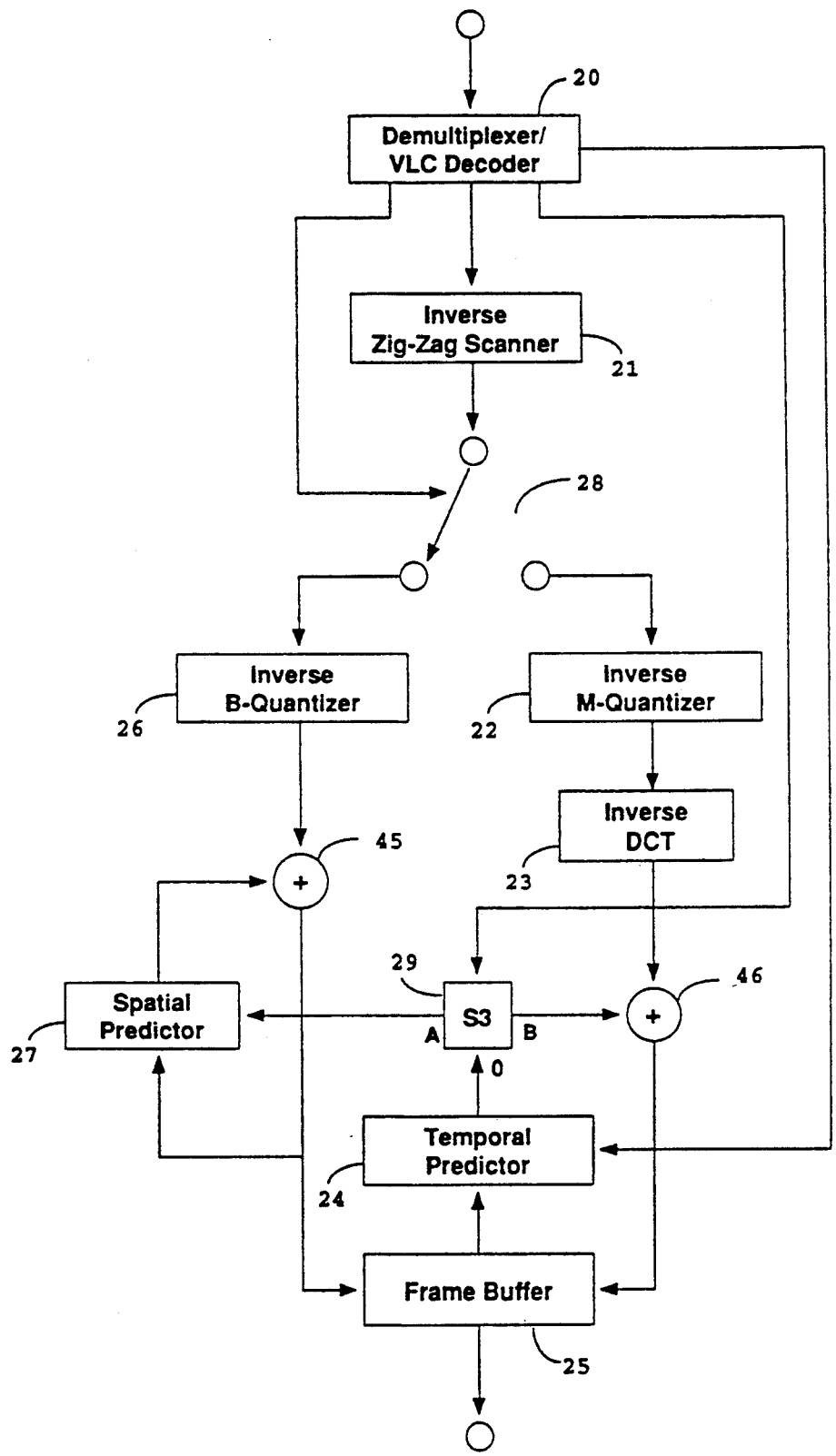
FIG. 2 is a block diagram of a decoder performing a video signal coding method of the present invention.

An embodiment of a video signal decoding apparatus of the present invention is shown in FIG. 2. In this embodiment, the encoded video signal or bit-stream is inputted to a demultiplexer/VLC decoder 20 followed by an inverse zig-zag scanner 21, which demultiplexes and decodes the variable length encoded run-length codes to reconstruct quantized coefficient of each block of the coded frames. The decoded quantized coefficient block will be processed in either one of two different manners depending upon whether the block is a coded edge block or a coded non-edge block. The selection of the subsequent process is determined by a switch 28 which is controlled by a decoded edge block or non-edge block signal from the demultiplexer/VLC decoder 20. The decoded quantized coefficient block, if it is a coded non-edge block, is subjected by the switch 28 to an inverse M-quantization process in an inverse M-quantizer 22, and an inverse discrete cosine transformation process in an inverse discrete cosine transformer (Inverse DCT) 23. If it is coded using the motion compensation process, a motion displaced block is predicted by a temporal predictor 24 using the transmitted motion vector decoded by the demultiplexer/VLC decoder 20 followed by a switch 29 controlled by decoded motion compensation information of the block from the demultiplexer/VLC decoder 20 to add to the output of the inverse discrete cosine transformer 23 at an adder 46 to obtain a reconstructed block. The reconstructed block is placed into a frame buffer 25. If the decoded quantized coefficient block is a coded edge block, each coefficient in the block switched by the switch 28 is inverse quantized by an inverse B-quantizer 26 and added by an adder 45 with a predicted pixel value determined by the corresponding temporal predictor 24 and spatial predictor 27 to obtain a reconstructed block. The reconstructed block is placed into the frame buffer 25 and possibly into the spatial predictor 27 for prediction of pixels from the same block. If the block is determined by the decoded bit stream information at the demultiplexer/VLC decoder 20 to be a motion compensated block, the switch 29 will be set to a position A where a motion predicted block from the temporal predictor 24 is used to predict the decoding pixels.

What is claimed is:

1. A video signal coding method comprising of the steps of:
   partitioning each frame of an input video signal into smaller blocks of pixel data;
   subjecting each block to an edge detection which examines the block and its surround blocks to determine if the block can be classified as an edge block;
   subjecting the block to a discrete cosine transform coding process, if the block is not classified as an edge block, where the block is discrete cosine transformed into DCT coefficients, quantized, zig-zag scanned, and run-length encoded with variable length codes; and
   subjecting the edge block to a differential pulse code modulation process, if the block is classified as an edge block, where each of the pixel value in the block is predicted, the differences between the pixel values and the predicted values are quantized and run-length encoded with variable length codes.

2. A video signal coding method according to claim 1, wherein before subjecting said block to said discrete cosine transform coding process or said differential pulse code modulation process, said block is subjected to a motion compensation process to reduce temporal redundancy.

3. A video signal decoding method for decoding a video signal coded by a coding method according to claim 1, comprising the step of:
   decoding the variable length encoded run-length codes to reconstruct the quantized coefficients of each said encoded block of said each frame of input video signal;
   subjecting each of the decoded quantized coefficient blocks, if it is coded by said discrete cosine transform coding process, to an inverse quantization process, and an inverse discrete cosine transformation process to reconstruct block pixel data to be placed into a frame buffer; and
   subjecting each coefficient in the quantized coefficient block, if the decoded quantized coefficient block is coded by said differential pulse code modulation process, to an inverse quantization and addition with a predicted pixel value to reconstruct block pixel values to be placed into the frame buffer.

* * * * *